Patented May 16, 1950

2,508,221

UNITED STATES PATENT OFFICE 2,508,221

RECOVERY OF ETHYLIDENE FLUORIDE FROM GAS MIXTURES CONTAINING SAME

John D. Calfee, Manhasset, and Francis H. Bratton, Floral Park, N. Y., assignors to Allied Chemical & Dye Corporation, a corporation of New York No Drawing. Application October 26, 1946, Serial No. 706,060

10 Claims. (Cl. 183—115)

1

This invention relates to the recovery of ethylidene fluoride from gas mixtures containing the same and methyl chloride, and also to the recovery of methyl chloride from such gas mixtures.

Gas mixtures of ethylidene fluoride and methyl chloride may be used in or obtained from various commercial processes. Each of these components possesses known solvent properties, and in some chemical operations it is often desirable to recover ethylidene fluoride and/or methyl chloride as such from gas mixtures containing ethylidene fluoride and methyl chloride, or at least to form ethylidene fluoride-methyl chloride gas mixtures which are reconcentrated with respect to ethylidene fluoride or methyl chloride contents. However, since the boiling points of minus 24.7° C. for ethylidene fluoride and minus 24° C. for methyl chloride are so close, known methods, such as by distillation, for separating these components are ineffective.

The primary object of this invention is to provide a practical low-cost process by the practice of which it is conveniently possible to remove methyl chloride from gas mixtures containing the same and ethylidene fluoride to such an extent as to form a gas mixture having a substantially enriched ethylidene fluoride concentration. The invention also affords provision of a process for forming gas mixtures which are reconcentrated with regard to methyl chloride content. If desired, the principles of the invention may be utilized to recover ethylidene fluoride and/or methyl chloride practically as such from starting gas mixtures of the type described.

The objects and advantages of the invention will appear from the following detailed description:

In accordance with the invention, it has been found that substantial portions of the methyl chloride component may be removed or separated from initial or starting gas mixtures containing methyl chloride and ethylidene fluoride by contacting such gas mixture with a liquid petroleum hydrocarbon having a boiling point above about 100° C. We find that the methyl chloride constituent is separated from such gas mixtures by the herein described liquid petroleum hydrocarbon, probably by preferential extraction, and that there is formed by the contacting operation an off-gas which is substantially enriched with respect to ethylidene fluoride. Also, it has been found possible to recover or remove the methyl chloride from such liquid petroleum hydrocarbon in such a way as to obtain a gas mixture which is likewise enriched with respect to methyl chloride.

The term "liquid petroleum hydrocarbon" as employed herein and in the claims is intended to denote and include liquid hydrocarbons of natural petroleum (mineral oil) origin as well as of synthetic origin. Mixtures of such liquid hydrocarbons may also be employed. These hydrocarbons are preferably predominantly non-aromatic, although mixtures thereof, especially cracked petroleum oils, usually contain some aromatic constituents. As noted above, the liquid petroleum hydrocarbons suitable for use as the separating medium of our invention have a minimum boiling point above 100° C. The lower boiling point is dependent upon the vapor pressure of such hydrocarbons since appreciable amounts of these hydrocarbons should not be present in the enriched gas. The upper boiling point limit which these liquid hydrocarbons may possess is governed by the viscosity of such hydrocarbons since it is desirable that the viscosity of these liquid hydrocarbons be not so great as to offer substantial impedance to passage of the gas therethrough. We prefer to employ as the methyl chloride separating medium distilled petroleum fractions boiling approximately in the range of 150–300° C. and obtainable commercially as kerosene. Higher or lower boiling, liquid, substantially non-aromatic lubricating oils may also be used providing their viscosity or vapor pressure is not too great.

The process may be carried out by contacting, in any suitable manner, a gas mixture containing ethylidene fluoride and methyl chloride with the liquid hydrocarbon. For example, the gas stream being treated may be fed into the bottom of a receptacle containing an adeqate quantity of the liquid petroleum hydrocarbon and provided at the bottom and top with a gas inlet and gas outlet respectively, and also with means for satisfactorily dispersing the gas stream throughout the body of liquid. The contacting operation may be effected by passing the gas stream thru a single body of the petroleum hydrocarbon or, in cases where high ultimate concentration of ethylidene fluoride is desired, the gas stream may be passed successively thru a plurality of receptacles connected in series and each containing a body of the liquid hydrocarbon. Preferably, the contacting step may be carried out by passing the gas stream to be treated into the bottom of and upwardly thru a suitably packed tower or a properly designed bubble plate tower countercurrent to a continuous downflow of the petroleum hydrocarbon continuously introduced into the top of and continuously discharged from the bottom of such tower. In such procedure, gas enriched in ethylidene fluoride is discharged from the top of the tower and the liquid effluent thereof is high in methyl chloride. Also, concurrent continuous contacting of gas and liquid may be employed. The gas-liquid contacting operation in general is characterized in that at the outset of contact of gas mixture and liquid petroluem hydrocarbon substantially complete absorption of the gas takes place first, it appearing that initially the petroleum hydrocarbon takes up both ethylidene fluoride and methyl chloride. Following preliminary contacting of gas and liquid, the liquid retains the methyl chloride component of the incoming gas mixture to a greater or lesser extent, and the off-gas becomes markedly enriched as to ethylidene fluoride conentration.

During the gas-liquid contacting step, conditions of temperature and pressure of the liquid petroleum hydrocarbon preferably should be maintained low enough so that the specific liquid being utilized has substantially no or at least an unobjectionable vapor pressure under the particular contacting conditions at hand. Usually liquid temperatures are maintained within the range of minus 20° C. to plus 100° C. When employing kerosene, the preferred methyl chloride separating medium, best results are obtained when temperatures of the liquid hydrocarbon are held, e. g. by suitable cooling equipment, within the range of minus 5° C. to plus 50° C. Pressures in the contacting zone may be varied, normal atmospheric pressure being preferred, although sub- and superatmospheric pressures may be utilized. In any case, in accordance with the temperatures employed, pressures are chosen so that the hydrocarbon liquid exerts no objectionable vapor pressure. Pressure of the incoming gas mixture may be adjusted to obtain an economical feed rate and is usually slightly above atmospheric if the pressure in the contacting zone is atmospheric. Incoming gas pressure is also dependent on the viscosity of the particular liquid petroleum hydrocarbon being used, higher gas pressures being employed when the more viscous high boiling liquid hydrocarbons are utilized.

The principles of the invention are applicable to the handling of initial or starting gas mixtures which contain ethylidene fluoride and methyl chloride in any proportions, and which may contain other diluent gases. However, gas mixtures preferably employed are those containing ethylidene fluoride predominantly.

The following examples serve to illustrate our invention. All parts indicated are parts by weight.

*Example 1.*—A gaseous mixture of ethylidene fluoride and methyl chloride containing 62% ethylidene fluoride by weight was introduced thru a sintered glass dispersion disc into the bottom of a receptacle having a gas outlet at the top and containing 1200 parts of kerosene. The kerosene was kept at about 0° C. by immersing the receptacle in an ice bath. The feed rate of the gas was 67 parts per hour. Complete absorption of the gas was observed when it was first passed into the kerosene. After about 10 minutes, an off-gas was discharged from the receptacle. 19 parts by weight were collected by passing the off-gas into a trap maintained at minus 78° C. with dry ice and acetone. The sample was placed in a Podbielniak type still and refluxed to remove traces of dissolved air, and was then condensed in an evacuated trap cooled by dry ice. The composition of the thus condensed off-gas sample was determined by flashing a portion into a gas density balance and was found to be by weight 86 parts of ethylidene fluoride and 14 parts of methyl chloride. This amounted to an increase in the ethylidene fluoride content of the gas from 62 to 86 parts per hundred.

*Example 2.*—A gaseous mixture of ethylidene fluoride and methyl chloride containing 62% ethylidene fluoride by weight was fed at the rate of 66 parts per hour into the first of four receptacles connected in series and kept at about 0° C. by an ice bath. Each trap contained 275 parts of kerosene and was fitted with a gas feed line which introduced the gas into each receptacle thru a sintered glass dispersion disc located in the bottom of the receptacle. The operation as a whole was conducted at a pressure slightly over the atmospheric pressure required to force the gas thru the system. Handling and mode of analysis of the off-gas of the fourth and last receptacle was the same as described in Example 1. The ethylidene fluoride content of the off-gas was found to have increased from 62 to 95 parts per hundred.

*Example 3.*—89 parts by weight of a gaseous mixture of ethylidene fluoride and methyl chloride containing 82% by weight of ethylidene fluoride were fed at the rate of 49 parts per hour into and thru the 4-receptacle apparatus under the conditions noted in Example 2. A 20 parts by weight sample of the off-gas of the last receptacle was collected and analyzed as in Example 1, and the ethylidene fluoride content of such off-gas was found to have increased from 82% to 98% by weight. At the end of the run, the gas space at the top of each receptacle was connected to an evacuated trap packed with a mixture of dry ice and acetone. In this manner, by pressure reduction, substantially all of the gas (both ethylidene fluoride and methyl chloride) absorbed in the kerosene in each receptacle was desorbed and was separately collected in an individual trap. Ethylidene fluoride and methyl chloride compositions of the materials collected in each of the four traps were determined as previously described. The material recovered in the trap connected to the #1 receptacle analyzed 73% ethylidene fluoride: in the trap connected to the #2 receptacle, 82% ethylidene fluoride: in the trap connected to the #3 receptacle, 85% ethylidene fluoride: and in the trap connected to the #4 receptacle, 95% ethylidene fluoride: balance in each case being methyl chloride.

In the practice of the invention there may be instances in which it is desired to form an ethylidene fluoride-methyl chloride gas mixture which is more concentrated with respect to methyl chloride than was the initial or starting mixture of ethylidene fluoride and methyl chloride. For example, at the end of a batch gas-liquid contacting operation, when the liquid petroleum hydrocarbon has reached a condition of approximate equilibrium and further use of such liquid as a methyl chloride absorbent appears uneconomical, the "spent" liquid may be removed from the gas-liquid contacting zone and desorbed e. g. by increasing the temperature or by reducing pressure, or both. By a sufficient change of temperature or pressure conditions, substantially all the ethylidene fluoride and methyl chloride contained in the liquor subjected to desorption may be removed. The off-gas from the desorbing step has a lower ethylidene fluoride content and a higher methyl chloride content than the corresponding concentrations of the initial or starting mixture of ethylidene fluoride and methyl chloride. Thus, following an absorption operation, by a single desorption operation there is formed an ethylidene fluoride-methyl chloride gas mixture which has a methyl chloride concentration higher than that of the initial ethylidene fluoride-methyl chloride gas mixture.

If it is desired to produce an ethylidene fluoride-methyl chloride gas mixture having a high e. g., predominating methyl chloride content, and if the off-gas of the first desorbing step does not meet the desired requirements as to high methyl chloride content, such off-gas may be subjected to a second absorbing operation, after which the ethylidene fluoride-methyl chloride petroleum liquor formed in the second absorbing operation may be subjected to a second desorbing step. The off-gas of the second desorbing step has a still lower ethylidene fluoride content and a still higher methyl chloride content than the corresponding concentrations of off-gas of the first desorbing step. Hence, by successive repetitions of absorption and desorption, to the extent desired there may be formed a gas having substantially any desired methyl chloride content.

The effluent liquid of a continuous countercurrent gas-liquid contacting operation may contain substantially less ethylidene fluoride and methyl chloride than such liquid is capable of absorbing, this condition being generally the case particularly when the contacting operation is carried out countercurrently in a properly designed bubble plate tower. In accordance with the invention, it has been found that, whether the liquid petroleum hydrocarbon used in a gas-liquid contacting operation contains all or less than all of the ethylidene fluoride and methyl chloride such liquid hydrocarbon is capable of absorbing, the off-gas from a subsequent desorbing step is enriched in methyl chloride as compared with the methyl chloride concentration of the starting ethylidene fluoride-methyl chloride gas mixture. Hence, the above described principles relating to the formation of gas mixtures enriched in methyl chloride also apply to the desorption of the effluent liquid of a continuous countercurrent gas-liquid contacting operation as well as to the desorption of a relatively "spent" liquid removed from the gas-liquid contacting zone of a batch operation.

We claim:

1. The process of recovering ethylidene fluoride from a gas mixture containing ethylidene fluoride and methyl chloride which process comprises passing said gas mixture thru kerosene to thereby extract methyl chloride from said gas mixture, and recovering an off-gas enriched in ethylidene fluoride.

2. The process of recovering ethylidene fluoride from a gas mixture containing ethylidene fluoride predominantly and methyl chloride which process comprises passing said gas mixture thru kerosene to thereby extract methyl chloride from said gas mixture, and recovering an off-gas enriched in ethylidene fluoride.

3. The process of recovering ethylidene fluoride from a gas mixture containing ethylidene fluoride and methyl chloride which process comprises passing said gas mixture thru kerosene while maintaining said kerosene at temperature within the range of $-5°$ C. to $+50°$ C. to thereby extract methyl chloride from said gas mixture, and recovering an off-gas enriched in ethylidene fluoride.

4. The process which comprises passing an initial gas mixture containing ethylidene fluoride and methyl chloride thru kerosene while maintaining said kerosene at temperature within the range of $-5°$ C. to $+50°$ C. to thereby extract methyl chloride from said gas mixture and form an off-gas enriched in ethylidene fluoride, and separating absorbed gases from said kerosene to thereby form a gas mixture enriched with methyl chloride as compared with the methyl chloride concentration of said initial gas mixture.

5. The process of recovering ethylidene fluoride from a gas mixture containing ethylidene fluoride and methyl chloride which process comprises contacting said gas with a predominantly non-aromatic liquid petroleum hydrocarbon oil boiling within the range of 150–300° C., to thereby extract methyl chloride from said gas mixture and form an off-gas enriched in ethylidene fluoride.

6. The process of recovering ethylidene fluoride from a gas mixture containing ethylidene fluoride and methyl chloride which process comprises contacting said gas with a mixture of predominantly non-aromatic liquid petroleum hydrocarbons boiling within the range of 150–300° C., to thereby extract methyl chloride from said gas mixture and form an off-gas enriched in ethylidene fluoride.

7. The process of recovering ethylidene fluoride from a gas mixture containing ethylidene fluoride and methyl chloride which process comprises contacting said gas with a predominantly non-aromatic liquid petroleum hydrocarbon oil boiling within the range of 150–300° C. while maintaining said hydrocarbon at temperature within the range of minus 20° C. to plus 100° C. to thereby extract methyl chloride from said gas mixture and form an off-gas enriched in ethylidene fluoride.

8. The process of recovering ethylidene fluoride from a gas mixture containing ethylidene fluoride and methyl chloride which process comprises contacting said gas with a predominantly non-aromatic liquid petroleum hydrocarbon oil boiling within the range of 150–300° C. while maintaining said hydrocarbon at temperature not exceeding that at which said hydrocarbon has substantial vapor pressure under prevailing conditions of operation, to thereby extract methyl chloride from said gas mixture and form an off-gas enriched in ethylidene fluoride.

9. The process of recovering ethylidene fluoride from a gas mixture containing ethylidene fluoride and methyl chloride which process comprises contacting said gas with a predominantly non-aromatic liquid petroleum hydrocarbon oil boiling within the range of 100–300° C. while maintaining said hydrocarbon at temperature within the range of minus 20° C. to plus 100° C., the boiling point of said hydrocarbon being above that at which said hydrocarbon has substantial vapor pressure under prevailing conditions of operation, to thereby extract methyl chloride from said gas mixture and form an off-gas enriched in ethylidene fluoride.

10. The process which comprises contacting a gas mixture containing ethylidene fluoride and methyl chloride with a predominantly non-aromatic liquid petroleum hydrocarbon oil boiling within the range of 150–300° C. while maintaining said hydrocarbon at temperature within the range of minus 20° C. to plus 100° C. to thereby extract methyl chloride from said gas mixture and form an off-gas enriched in ethylidene fluoride; and recovering methyl chloride from said liquid hydrocarbon.

JOHN D. CALFEE.
FRANCIS H. BRATTON.

REFERENCES CITED

The following references are of record in the file of this patent:

UNITED STATES PATENTS

| Number | Name | Date |
|---|---|---|
| 2,384,449 | Benning et al. | Sept. 11, 1945 |